(12) United States Patent
Ion et al.

(10) Patent No.: US 12,710,728 B2
(45) Date of Patent: Aug. 18, 2026

(54) INLAID TIMEPIECE COMPONENT AND METHOD FOR MANUFACTURING THE SAME

(71) Applicant: COMADUR SA, Le Locle (CH)

(72) Inventors: Alberto Puiu Ion, Limoges (FR); Fabrice Rossignol, Saint Priest sous Aixe (FR); Olivia De Los Cobos, Beaucourt (FR); Alexandre Netuschill, Le Cerneux-Péquignot (FR)

(73) Assignee: COMADUR SA, Le Locle (CH)

( * ) Notice: Subject to any disclaimer, the term of this patent is extended or adjusted under 35 U.S.C. 154(b) by 399 days.

(21) Appl. No.: 18/348,026

(22) Filed: Jul. 6, 2023

(65) Prior Publication Data

US 2024/0077836 A1 Mar. 7, 2024

(30) Foreign Application Priority Data

Sep. 2, 2022 (FR) ...................................... 2208820

(51) Int. Cl.
*G04B 45/00* (2006.01)
*B22F 7/06* (2006.01)
(Continued)

(52) U.S. Cl.
CPC ............ *G04B 45/0076* (2013.01); *B22F 7/06* (2013.01); *B22F 10/25* (2021.01); *B22F 10/66* (2021.01);
(Continued)

(58) Field of Classification Search
CPC .. G04B 37/0008; G04B 37/22; G04B 37/223; G04B 37/225; G04B 45/0076; G04B 45/0015; G04B 19/12; G04B 19/18; G04B 19/28; G04B 19/106; B22F 7/06; B22F 10/25; B22F 10/66; B22F 2999/00; B22F 2003/247; B33Y 10/00; B33Y 80/00; C04B 41/009; C04B 41/51; C04B 41/88; C04B 41/4543; C04B 41/4576; C04B 35/48; C04B 35/00; C23C 24/08; C23C 24/082; C23C 24/087; C23C 28/02; C23C 28/023;
(Continued)

(56) References Cited

U.S. PATENT DOCUMENTS

2004/0257915 A1 12/2004 Miyama
2015/0092524 A1 4/2015 Verdon

FOREIGN PATENT DOCUMENTS

CH 711 152 B1 1/2020
EP 3 078 436 A1 10/2016
(Continued)

OTHER PUBLICATIONS

Machine Translation, Frely, WO 2015/158631 A2, Oct. 22, 2015. (Year: 2015).*
European Search Report for FR 2208820 dated Feb. 27, 2023.

*Primary Examiner* — Michael E. La Villa
(74) *Attorney, Agent, or Firm* — Sughrue Mion, PLLC

(57) ABSTRACT

An inlaid timepiece component (1) including a body (10) made of a metallic and/or ceramic material including at least one hollow (11) forming the impression of a decoration (12). The at least one hollow is completely filled with successive strata (13, 14, 15) formed by an agglomeration of particles (16) via a cold metallisation in order to form a timepiece component (1) inlaid with at least one decoration (12).

12 Claims, 1 Drawing Sheet

(51) Int. Cl.

| | |
|---|---|
| ***B22F 10/25*** | (2021.01) |
| ***B22F 10/66*** | (2021.01) |
| ***B32B 3/10*** | (2006.01) |
| ***B32B 3/14*** | (2006.01) |
| ***B32B 3/26*** | (2006.01) |
| ***B32B 3/30*** | (2006.01) |
| ***B32B 15/01*** | (2006.01) |
| ***B32B 15/04*** | (2006.01) |
| ***B32B 15/16*** | (2006.01) |
| ***B32B 15/18*** | (2006.01) |
| ***B32B 15/20*** | (2006.01) |
| ***B32B 18/00*** | (2006.01) |
| ***B33Y 10/00*** | (2015.01) |
| ***B33Y 80/00*** | (2015.01) |
| ***C04B 41/00*** | (2006.01) |
| ***C04B 41/51*** | (2006.01) |
| ***C04B 41/88*** | (2006.01) |
| ***C23C 24/08*** | (2006.01) |
| ***C23C 28/00*** | (2006.01) |
| ***C23C 28/02*** | (2006.01) |
| ***C23C 30/00*** | (2006.01) |
| ***G04B 19/12*** | (2006.01) |
| ***G04B 19/18*** | (2006.01) |
| ***G04B 19/28*** | (2006.01) |
| ***G04B 37/00*** | (2006.01) |
| ***G04B 37/22*** | (2006.01) |
| *G04B 19/10* | (2006.01) |

(52) U.S. Cl.

CPC .................. *B32B 3/10* (2013.01); *B32B 3/14* (2013.01); *B32B 3/263* (2013.01); *B32B 3/30* (2013.01); *B32B 15/01* (2013.01); *B32B 15/04* (2013.01); *B32B 15/043* (2013.01); *B32B 15/16* (2013.01); *B32B 15/18* (2013.01); *B32B 15/20* (2013.01); *B32B 18/00* (2013.01); *B33Y 10/00* (2014.12); *B33Y 80/00* (2014.12); *C04B 41/009* (2013.01); *C04B 41/51* (2013.01); *C04B 41/88* (2013.01); *C23C 24/08* (2013.01); *C23C 24/082* (2013.01); *C23C 24/087* (2013.01); *C23C 28/02* (2013.01); *C23C 28/023* (2013.01); *C23C 28/32* (2013.01); *C23C 28/322* (2013.01); *C23C 28/34* (2013.01); *C23C 28/345* (2013.01); *C23C 30/00* (2013.01); *C23C 30/005* (2013.01); *G04B 19/12* (2013.01); *G04B 19/18* (2013.01); *G04B 19/28* (2013.01); *G04B 37/0008* (2013.01); *G04B 37/22* (2013.01); *G04B 37/223* (2013.01); *G04B 37/225* (2013.01); *G04B 45/0015* (2013.01); *B22F 2999/00* (2013.01); *G04B 19/106* (2013.01); *Y10T 428/12389* (2015.01); *Y10T 428/12396* (2015.01); *Y10T 428/12576* (2015.01); *Y10T 428/12604* (2015.01); *Y10T 428/12611* (2015.01); *Y10T 428/12618* (2015.01); *Y10T 428/12771* (2015.01); *Y10T 428/12806* (2015.01); *Y10T 428/12847* (2015.01); *Y10T 428/12882* (2015.01); *Y10T 428/12903* (2015.01); *Y10T 428/12951* (2015.01); *Y10T 428/12993* (2015.01); *Y10T 428/2495* (2015.01); *Y10T 428/24959* (2015.01); *Y10T 428/24967* (2015.01); *Y10T 428/263* (2015.01); *Y10T 428/264* (2015.01); *Y10T 428/265* (2015.01)

(58) Field of Classification Search

CPC ....... C23C 28/32; C23C 28/322; C23C 28/34; C23C 28/345; C23C 30/00; C23C 30/005; B32B 3/10; B32B 3/14; B32B 3/263; B32B 3/30; B32B 15/01; B32B 15/04; B32B 15/043; B32B 15/16; B32B 15/18; B32B 15/20; B32B 18/00; Y10T 428/12389; Y10T 428/12396; Y10T 428/12576; Y10T 428/12597; Y10T 428/12604; Y10T 428/12611; Y10T 428/12618; Y10T 428/12771; Y10T 428/12806; Y10T 428/12847; Y10T 428/12882; Y10T 428/12903; Y10T 428/12951; Y10T 428/12993; Y10T 428/2495; Y10T 428/24959; Y10T 428/24967; Y10T 428/263; Y10T 428/264; Y10T 428/265

See application file for complete search history.

(56) References Cited

FOREIGN PATENT DOCUMENTS

| | | | |
|---|---|---|---|
| EP | 2 856 903 | B1 | 7/2017 |
| JP | 2004-279169 | A | 10/2004 |
| JP | 2015-72270 | A | 4/2015 |
| WO | 2015/158631 | A2 | 10/2015 |

* cited by examiner

INLAID TIMEPIECE COMPONENT AND METHOD FOR MANUFACTURING THE SAME

CROSS REFERENCE TO RELATED APPLICATIONS

The present application is based on, and claims priority from the prior French Patent Application No. 2208820, filed on Sep. 2, 2022, the entire contents of which are incorporated herein by reference.

TECHNICAL FIELD OF THE INVENTION

The invention relates to a timepiece component inlaid with at least one metallic and/or ceramic decoration and to a method for manufacturing the same.

TECHNOLOGICAL BACKGROUND

It is known to form timepiece components such as watch bezels at least partially made of ceramic, metal or composite to show a deposit performed in a recess beneath the bezel forming for example a graduation or a commercial brand. This configuration has the advantage of protecting the deposit from any mechanical degradation by complete coverage of the portion made of sapphire. However, this configuration may make the decoration difficult to read by the distorted transmission of the colouration of the deposit but also by the lack of tint difference of the sapphire compared to that of the deposit.

To overcome these drawbacks, an inlaid ceramic element has been proposed including a body made of ceramic including at least one hollow forming the impression of a decoration, said at least one hollow being completely filled with first and second electrically-conductive layers of substantially 50 nm and a metallic galvanic deposition in order to form a ceramic element inlaid with at least one metallic decoration with an improved visual quality.

However, making such a part is still complex, expensive, time-consuming and it is necessary to place a hooking layer (conductive layer) to make the decorations. In addition, it is complicate to perfectly fill the cavities forming a decoration or a graduation while obtaining an impeccable visual aspect thereof.

SUMMARY OF THE INVENTION

In particular, an objective of the invention is to overcome the different drawbacks of the prior art.

To this end, the invention relates to an inlaid timepiece component including a body made of a metallic and/or ceramic material including at least one hollow forming the impression of a decoration. According to the invention, said at least one hollow is completely filled with successive strata formed by an agglomeration of particles via a cold metallisation in order to form a timepiece component inlaid with at least one decoration.

According to other advantageous alternative embodiments of the invention:

- the particles forming the strata are metallic and/or at least partially made of ceramic and are selected from among: copper, zinc, tin, titanium, niobium, zirconium, tantalum, chromium, iron, zirconia or alumina;
- each at least one hollow includes a depth of at least 100 μm, and preferably of 200 μm;

- the at least one decoration is covered by a metal layer coloured by means of an anodisation;
- the timepiece component is an external part element such as a bezel, a back, a dial, a middle, a wristlet link, a crown, a push-piece.

The invention also relates to a timepiece including at least one inlaid timepiece component in accordance with the invention.

The invention also relates to a method for manufacturing an inlaid timepiece component including the following steps:

a) forming a body made of a metallic and/or ceramic material;

b) engraving at least one hollow in a face of the body at each at least one hollow forming the impression of a decoration;

c) depositing a first stratum of a coating over a thickness of at least 10 μm over the entire face including said at least one hollow by a process of cold projection, called "cold spray", of a flow comprising a carrier gas and particles forming said coating;

d) repeating step c) once or several times to deposit one or more additional strata of 20 μm each over the entire face including said at least one hollow covered with the first stratum in order to completely fill said at least one hollow and form an inlaid decoration;

e) performing a polishing to remove all deposits of the strata off the surface of the body in order to leave them only in the at least one hollow.

In accordance with other advantageous variants of the method according to the invention:

- the flow of the carrier gas has a flow rate comprised between 85 and 90 m3/h, at a pressure comprised between 45 and 60 bar and at a temperature comprised between 800 and 1,000° C.;
- the particles are made of metal or metal alloy, ceramic or caramels;
- the mass flow rate of the particles is comprised between 70 and 80 g/min;
- the size of the particles is at most 45 μm;
- the size of the particles is comprised between 1 and 25 μm;
- the method comprises an optional step between step b) and c) during which the hollow is engraved or textured via a laser to improve the adhesion of the particles;
- the method comprises an optional step after step f) during which an anodisation of the decorations is performed to colour said decorations.

BRIEF DESCRIPTION OF THE FIGURES

Other features and advantages of the invention will appear upon reading the following detailed description given as a non-limiting example, with reference to the appended drawings wherein.

DETAILED DESCRIPTION OF THE INVENTION

Figure 1:
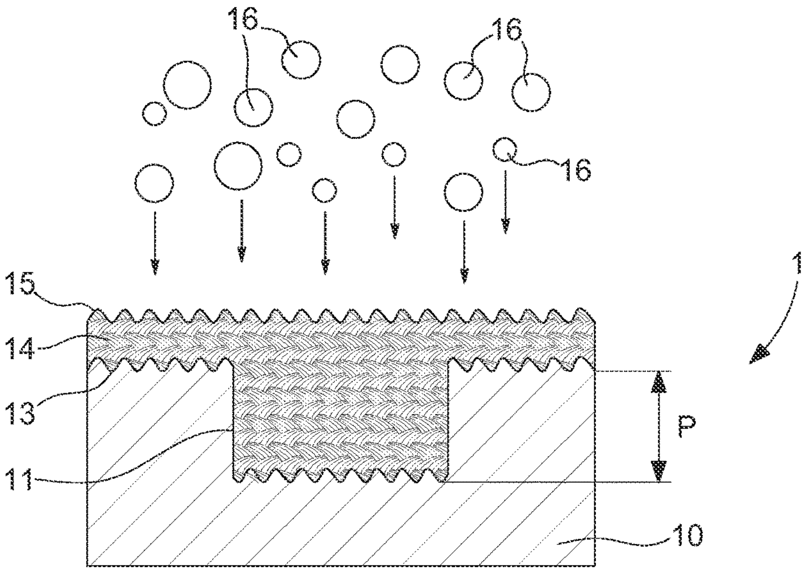
FIG. 1 represents a sectional view of a timepiece component covered with several strata.

In the example illustrated in FIG. 1, one could see a timepiece component 1. The inlaid timepiece component 1 comprises a body 10 made of a metallic and/or ceramic material including at least one hollow 11 forming the impression of a decoration 12. The at least one hollow 11 is completely filled with successive strata 13, 14, 15 formed by an agglomeration of particles 16 via a cold metallisation, more commonly called "cold spray" in order to form a timepiece component 1 inlaid with at least one decoration 12.

The cold metallisation or "cold spray" technique consists in accelerating beyond a critical speed a filler material (300 to 1,500 m/s) in the form of a powder or particles. These speeds cause a plastic deformation and/or a fragmentation upon impact of this material on a substrate to be treated, which is high enough to form a dense and adhesive coating. The temperatures of the projection gases are low (typically comprised between 300 and 1,100° C.) in comparison with the temperatures used in other processes. Hence, the material before impact is not molten. The ceramic materials are also projectable.

In the following description, only the case of a bezel 1 will be described but it goes without saying that the description applies for any other timepiece component, and more particularly the external parts of a timepiece such as a back, a dial, a middle, a crown, an oscillating mass or a push-piece.

In the example illustrated hereinafter, the explanation of the invention will therefore be given from a ring 10 made of a ceramic material including inlaid metallic decorations 12 forming the graduations of a bezel 4. Of course, a bezel made of metal or metal alloy, of ceramel or of a composite material is also possible.

The inlaid bezel 1 is intended to form a part that is very wear-resistance including at least one metallic decoration having an excellent visual quality and whose durability over time is improved.

Figure 2:
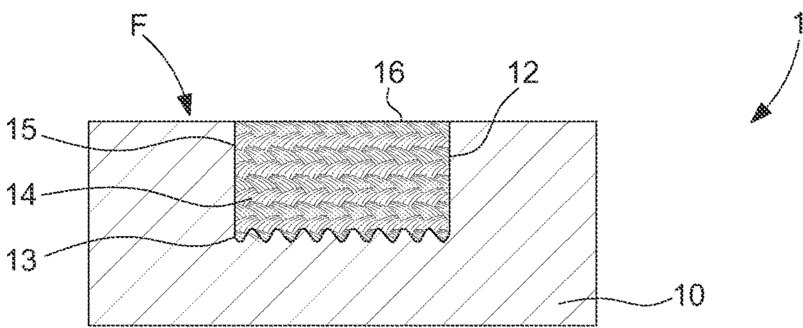
FIG. 2 represents a sectional view of a timepiece component according to the invention
Figure 3:
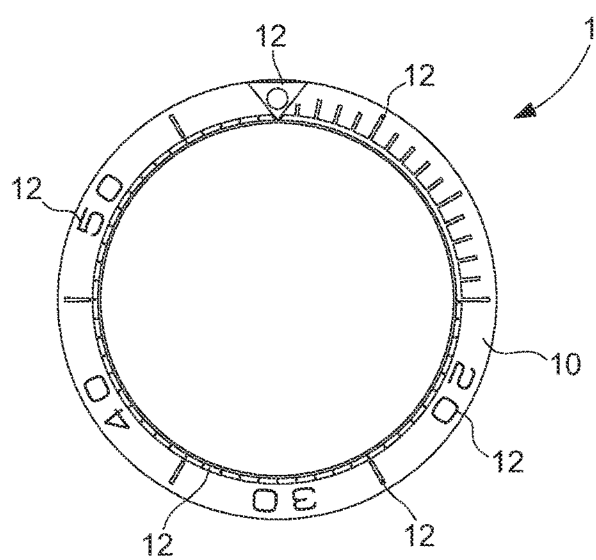
FIG. 3 represents a top view of a bezel for a timepiece obtained via a method according to the invention.

As illustrated in FIG. 2, the inlaid timepiece component 1 includes a body 10 made of ceramic including at least one hollow 11 forming the impression of a decoration 12. In FIG. 3, one could see that each decoration 12 may have any shape, such as, for example, a geometric figure or an alphanumeric character. According to the invention, each hollow 11 is completely filled with a plurality of strata 13, 14, 15 with a thickness comprised between 10 and 50 μm. This configuration allows protecting each metallic decoration 12 in the body 11 made of ceramic which is very wear-resistant.

Each hollow 11 includes a depth P comprised between 100 and 200 μm and their inner surface may have a varied geometric shape. For example, one could imagine a hollow shaped as a star, a rectangle or a triangle, and even a letter.

The body 10 is obtained from a wide variety of materials, in particular of ceramic. Preferably, a zirconia-based ceramic is used for its mechanical properties, its polishing capability and, to a lesser extent, for its capability to offer a wide range of tints. Of course, other ceramics may be considered like, for example, based on titanium carbide, or transparent polycrystalline ceramics based on alumina or spinel.

According to another embodiment, the body 10 is obtained from a metal material or a metal alloy.

The particles forming the strata are metallic and/or at least partially made of ceramic and are selected from among: copper, zinc, tin, titanium, niobium, zirconium, tantalum, chromium, iron, zirconia or alumina. According to a variant of the invention, strata made of different materials are used, for example a first portion of the strata may be made of zinc then the second one of titanium. Such an alternative allows reducing the manufacturing costs.

The first stratum 13 includes a thickness of substantially 20 μm and is located in the bottom of the hollow 11. Similarly, the second stratum 15 and the next strata have an increasing or identical thickness depending on the needs of a person skilled in the art. For example, the first stratum may have a thickness of 20 μm, the second stratum 30 μm, the third one 30 μm, the fourth one 40 μm, the fifth one 50 μm . . . . The succession of strata continues until the hollow is completely filled.

In addition, according to the invention, the visual appearance of each decoration 12 may be locally modified by colouring the last stratum, namely the stratum flush with the surface of the timepiece component, via an anodisation 16 for example, when the body 10 is made of ceramic.

In this respect, to facilitate the anodisation, at least the last one of the metallic strata is preferably made of aluminium or titanium.

In the case of a metallic body 10, the filling portion poses no problem, but the colouration via a colouring anodic oxidation at the local level will not be feasible, both the body 10 and the last stratum being conductive. It may then be considered to deposit the last stratum with a slight setback with respect to the surface of the body 10, then perform a colouring anodic oxidation over the entire part and finally remove the excess at the surface of the body via polishing operation for example. (another option: place a mask via a LIGA process).

The invention also relates to a method for manufacturing an inlaid timepiece component.

The method for manufacturing an inlaid timepiece component 10 will now be explained. In the following description, only the case of manufacture of a bezel 1 will be described but it goes without saying that the description applies to any other timepiece component as detailed before. Hence, the explanation of the method according to the invention will be given based on a ring 10 made of a ceramic material including inlaid metallic decorations 12 forming the graduations of a bezel 1.

In a first step a), the method consists in forming the body 10 made of ceramic, for example, of zirconia. In the case of a ceramic-based component, the latter is preferably obtained by sintering. At the end of step a), the body 10 includes its final dimensions.

The method includes a second step b) intended to engrave at least one hollow 11 which may be blind in a face F of the body 10, the hollows 11 forming the impression of the future decorations 12 as shown in FIG. 1. Each hollow 11 includes a minimum depth P of 100 μm, and preferably a depth of 200 μm. Each hollow 11 may have a varied geometric shape depending on the need of a person skilled in the art. For example, one could imagine a hollow shaped like a star, a rectangle or a triangle, and even an alphanumeric character.

In general, step b) is obtained by means of a laser ablation allowing for a good accuracy of the engravings. According to an optional step, at the end of step b), the at least one hollow is engraved or textured via a laser to improve the adhesion of the particles in the rest of the process.

The method continues according to a third step c) intended to deposit a first stratum 13 with a thickness equal to 20 μm over the entire face F, i.e. including in each of the hollows 11 as shown in FIG. 1.

The third step c) of the method consists in coating the face F by a cold metallisation more commonly called "cold spray". Thus, it is possible to deposit a particle layer which perfectly adheres to the body 10 without the presence of an adhesion layer.

The projected particles are made of metal or metal alloy, of ceramic or of ceramels.

To form the deposit over the substrate 10, the particles are projected by means of a carrier gas throughout a de Laval type spray nozzle to accelerate these and project them at high speed to make them adhere to the substrate.

In the illustrated example, titanium particles are projected with a size comprised between 1 and 50 μm, and preferably a particle size in the range from 5 to 25 μm and even more preferably with a size of 20 μm.

The primary gas is sent throughout the nozzle at a flow rate between 80 and 90 m3/hour, the flow rate being possibly varied according to the nozzle and the used gas. In general, helium and nitrogen are used alone or in combination. Helium has the advantage of enabling working at temperatures lower than nitrogen, and nitrogen has the advantage of being low-cost.

The temperature of the carrier gas lies in a range from 900° C. to 1,000° C., and the spray pressure lies in a range 45 to 60 bar.

In the case of a particle made of titanium, a temperature of 1,000° C. and a pressure of 50 bar allow obtaining very good results.

The particles re sent in the nozzle at a flow rate ranging from 70 to 80 g/min, and preferably at a flow rate of 75 g/h. Thus, the speed of the particles is comprised between 800 and 1,000 m/s.

The spray nozzle is kept at a distance in the range of 50 mm from the surface F of the bezel 1 and progresses at a speed of 0.15 m/sec during the deposition of each stratum.

In the case of a ceramic material substrate, a person skilled in the art will ensure that the parameters of the process are adapted during the deposition of the first stratum. The ceramic material is relatively fragile and the particles should be projected at a lower speed to avoid cracking and/or breaking up the substrate. Thus, during the deposition of the first stratum, the particles are sent in the nozzle at a flow rate of 20 g/min, the pressure, the flow rate and the temperature of the carrier gas remaining the same.

The method continues with a fourth step d) during which step c) is repeated one or several times to deposit one or more additional strata 14, 15 of at least 20 μm each over the entire face F including the at least one hollow 11 covering the first stratum 13. Step c) is repeated until completely filling the at least one hollow 11 and forming an inlaid decoration 12 in the bezel 1.

Finally, in a fifth step e), the method ends by removing the strata 13, 14 and 15 deposited over the surface F of the body 10 in order to leave them only at the level of each hollow 11 as shown in FIG. 2. Thus, the inlaid timepiece component 10 is completed and, possibly, has just to be mounted on a final part. This step may be obtained by a common surfacing process like grinding or lapping to remove the excess material followed by a polishing.

The method according to the invention may also provide for a last optional step intended to deposit a metallisation in order to colour the decorations 12. For example, such a layer may be made via an anodisation.

It goes without saying that the present invention is not limited to the example shown and that various alternatives and modifications that may be apparent to a person skilled in the art can be made thereto, while still remaining within the scope of the invention as defined by the claims.

The invention claimed is:

1. An inlaid timepiece component including a body made of a metallic and/or ceramic material including a least one hollow forming the impression of a decoration, wherein said at least one hollow is completely filled with successive strata formed by an agglomeration of particles via a cold spray in order to form a timepiece component inlaid with at least one decoration, wherein each of the at least one decoration is covered by a metal layer coloured by means of an anodisation.

2. The inlaid timepiece component according to claim 1, wherein the particles forming the successive strata are metallic or ceramic and are selected from among: copper, zinc, tin, titanium, niobium, zirconium, tantalum, chromium, iron, zirconia or alumina.

3. The inlaid timepiece component according to claim 1, wherein each at least one hollow has a minimum depth of 200 82 m.

4. The inlaid timepiece component according to claim 1, wherein the timepiece component is an external part element including one of: a bezel, a back, a dial, a middle, a wristlet link, a crown, or a push-piece.

5. A timepiece comprising at least one inlaid timepiece component in accordance with claim 4.

6. A method for manufacturing an inlaid timepiece component comprising the following steps:

a) forming a body made of a metallic and/or ceramic material;

b) engraving at least one hollow in a face of the body, each of at least one hollow forming an impression of a decoration;

c) depositing a first stratum of a coating over a thickness of at least 10 μm over the entire face including said at least one hollow by a process of cold projection of a flow comprising a carrier gas and particles forming said coating;

d) repeating step c) once or several times to deposit one or more additional strata of 20 μm each over the entire face including said at least one hollow covered with the first stratum in order to completely fill said at least one hollow and form an inlaid decoration;

e) performing a polishing to remove all deposits of the strata off the surface of the body in order to leave them only in the at least one hollow; and f) covering each of the decorations with a metal layer coloured by means of an anodisation.

7. The method according to claim 6, wherein the flow of the carrier gas has a flow rate comprised between 85 and 90 $m^3$/h, at a pressure comprised between 45 and 60 bar and at a temperature comprised between 900 and 1,000° C.

8. The method according to claim 7, wherein the particles are made of metal, metal alloy, or ceramic.

9. The method according to claim 7, wherein the mass flow rate of the particles is from 70 to 80 g/min.

10. The method according to claim 7, wherein a size of the particles is at most 45 μm.

11. The method according to claim 7, wherein a size of the particles is comprised between 1 and 25 μm.

12. The method according to claim 7, further comprising a step between step b) and c) during which the hollow is engraved or textured via a laser to improve the adhesion of the particles.

* * * * *